US012767179B2

(12) United States Patent
Pathare et al.

(10) Patent No.: US 12,767,179 B2
(45) Date of Patent: Oct. 20, 2026

(54) METHOD AND COMPUTER SYSTEM FOR MULTI-LEVEL CONTROL OF MOTION ACTUATORS IN AN AUTONOMOUS VEHICLE

(71) Applicant: Volvo Truck Corporation, Gothenburg (SE)

(72) Inventors: Deepthi Pathare, Gothenburg (SE); Leo Laine, Gothenburg (SE); Morteza Haghir Chehreghani, Gothenburg (SE); Erik Börve, Gothenburg (SE); Stefan Börjesson, Lindome (SE)

(73) Assignee: Volvo Truck Corporation, Gothenburg (SE)

( * ) Notice: Subject to any disclaimer, the term of this patent is extended or adjusted under 35 U.S.C. 154(b) by 108 days.

(21) Appl. No.: 18/828,328

(22) Filed: Sep. 9, 2024

(65) Prior Publication Data

US 2025/0091616 A1 Mar. 20, 2025

(30) Foreign Application Priority Data

Sep. 15, 2023 (EP) .................................... 23197734

(51) Int. Cl.
*B60W 60/00* (2020.01)
*B60W 30/16* (2020.01)
(Continued)

(52) U.S. Cl.
CPC ...... *B60W 60/0023* (2020.02); *B60W 30/162* (2013.01); *B60W 30/18163* (2013.01); *G06N 3/092* (2023.01)

(58) Field of Classification Search
CPC ........... B60W 60/0023; B60W 30/162; B60W 30/18163; B60W 2050/0004;
(Continued)

(56) References Cited

U.S. PATENT DOCUMENTS 6,169,981 B1 * 1/2001 Werbos .............. G05B 13/0285 706/26
11,243,532 B1 * 2/2022 Levihn ............... B60W 60/0011
(Continued)

FOREIGN PATENT DOCUMENTS

CN 114435396 A 5/2022
CN 117818615 A * 4/2024 ....... G06F 18/24155
(Continued)

OTHER PUBLICATIONS

Pathare, Deepthi, Leo Laine, and Morteza Haghir Chehreghani. "Tactical decision making for autonomous trucks by deep reinforcement learning with total cost of operation based reward." Artificial Intelligence Review 59.1 (2025): 27. (Year: 2025).*
(Continued)

*Primary Examiner* — Angelina M Shudy
(74) *Attorney, Agent, or Firm* — Withrow & Terranova, PLLC

(57) ABSTRACT

A computer system for controlling at least one motion actuator in an autonomous or semi-autonomous vehicle, the computer system comprising processing circuitry implementing a feedback controller, which is configured to sense an actual motion state of the vehicle and determine a machine-level instruction to the motion actuator for approaching or maintaining a setpoint motion state, and a reinforcement-learning agent, which is trained to perform decision-making regarding the setpoint motion state. The decisions by the reinforcement-learning agent are applied as the setpoint motion state of the feedback controller, and the machine-level instruction from the feedback controller is applied to the motion actuator.

12 Claims, 8 Drawing Sheets

(51) Int. Cl.
*B60W 30/18* (2012.01)
*G06N 3/092* (2023.01)

(58) Field of Classification Search
CPC ......... B60W 2050/0006; B60W 30/16; B60W 50/0098; G06N 3/092; G05D 1/00; G01C 21/00; G08G 1/00
See application file for complete search history.

(56) References Cited

U.S. PATENT DOCUMENTS

| | | | | |
|---|---|---|---|---|
| 11,461,589 | B1 * | 10/2022 | Bai | B25J 9/1671 |
| 11,544,556 | B2 * | 1/2023 | Goto | G05B 13/027 |
| 11,577,722 | B1 * | 2/2023 | Packer | G05D 1/0088 |
| 11,613,249 | B2 * | 3/2023 | Balakrishnan | B60W 30/06 701/27 |
| 11,734,575 | B2 * | 8/2023 | Agravante | G06N 3/045 706/21 |
| 12,077,182 | B2 * | 9/2024 | Guo | B60W 30/18163 |
| 12,091,052 | B2 * | 9/2024 | Kumavat | B60W 50/023 |
| 12,337,870 | B1 * | 6/2025 | Mukundan | B60W 60/0011 |
| 12,663,276 | B2 * | 6/2026 | Jeong | G01C 21/3469 |
| 2013/0293395 | A1 * | 11/2013 | Ohama | G08G 1/166 340/904 |
| 2015/0127150 | A1 * | 5/2015 | Ponulak | B25J 9/161 700/250 |
| 2018/0165603 | A1 * | 6/2018 | Van Seijen | G06N 3/08 |
| 2019/0265713 | A1 * | 8/2019 | Zhou | B60W 30/146 |
| 2019/0329772 | A1 * | 10/2019 | Graves | B60W 30/16 |
| 2019/0378036 | A1 * | 12/2019 | Tuzi | G06N 20/00 |
| 2019/0382011 | A1 * | 12/2019 | Bae | B60W 30/16 |
| 2020/0033869 | A1 * | 1/2020 | Palanisamy | B60W 40/04 |
| 2020/0062262 | A1 | 2/2020 | Kusari et al. | |
| 2020/0070344 | A1 * | 3/2020 | Lee | B25J 9/1664 |
| 2020/0139973 | A1 * | 5/2020 | Palanisamy | G06N 3/045 |
| 2020/0189590 | A1 * | 6/2020 | Luo | B60W 40/06 |
| 2020/0189597 | A1 | 6/2020 | Veronese et al. | |
| 2020/0284591 | A1 * | 9/2020 | Shapira | G06V 20/582 |
| 2020/0290620 | A1 | 9/2020 | Al Qizwini et al. | |
| 2020/0307577 | A1 * | 10/2020 | Nageshrao | G06N 3/0499 |
| 2021/0003973 | A1 * | 1/2021 | Chakrabarty | G06F 18/24133 |
| 2021/0074162 | A1 | 3/2021 | Jafari Tafti et al. | |
| 2021/0162589 | A1 * | 6/2021 | Tan | B62D 57/032 |
| 2021/0187733 | A1 * | 6/2021 | Lee | B25J 9/1602 |
| 2021/0237266 | A1 * | 8/2021 | Kalashnikov | B25J 9/163 |
| 2021/0241923 | A1 * | 8/2021 | Foschini | G16H 15/00 |
| 2021/0291826 | A1 * | 9/2021 | Benosman | B60W 30/16 |
| 2021/0370504 | A1 * | 12/2021 | Beardsworth | B25J 9/163 |
| 2021/0397195 | A1 * | 12/2021 | Toshev | B25J 9/1602 |
| 2022/0048513 | A1 * | 2/2022 | Xu | B60W 30/18163 |
| 2022/0203997 | A1 * | 6/2022 | Lee | G01R 31/382 |
| 2022/0219691 | A1 * | 7/2022 | Maleki | G06F 11/0754 |
| 2022/0219695 | A1 * | 7/2022 | Satti | G06N 3/09 |
| 2022/0314434 | A1 * | 10/2022 | Kranski | B25J 9/163 |
| 2022/0318678 | A1 * | 10/2022 | Kranski | G06N 20/00 |
| 2022/0348201 | A1 * | 11/2022 | Ostafew | B60W 50/0098 |
| 2022/0358749 | A1 * | 11/2022 | Yonetani | G06N 3/094 |
| 2023/0150591 | A1 * | 5/2023 | Subramanian | B62D 53/0871 701/124 |
| 2023/0365127 | A1 * | 11/2023 | Hu | B60T 7/22 |
| 2023/0376832 | A1 * | 11/2023 | Esna Ashari Esfahani | G06N 3/045 |
| 2023/0391362 | A1 * | 12/2023 | Liu | B60W 60/00272 |
| 2023/0400848 | A1 * | 12/2023 | Somarakis | G05B 23/0289 |
| 2024/0034349 | A1 * | 2/2024 | Suissa | B60W 60/001 |
| 2024/0069570 | A1 * | 2/2024 | Cho | B60W 30/00 |
| 2024/0116170 | A1 * | 4/2024 | Luo | B25J 9/1615 |
| 2024/0124003 | A1 * | 4/2024 | Wang | B60W 30/165 |
| 2024/0149918 | A1 * | 5/2024 | Li | G06N 20/00 |
| 2024/0152153 | A1 * | 5/2024 | Cho | B60W 30/165 |
| 2024/0200959 | A1 * | 6/2024 | Jeong | B60W 40/105 |
| 2024/0286033 | A1 * | 8/2024 | Lv | G06N 3/006 |
| 2025/0021107 | A1 * | 1/2025 | Zhang | B62D 57/032 |
| 2025/0065868 | A1 * | 2/2025 | Gupta | G06V 20/58 |
| 2025/0083687 | A1 * | 3/2025 | Harvey | B60W 30/0953 |
| 2025/0095487 | A1 * | 3/2025 | Kwon | B60W 60/001 |
| 2025/0108505 | A1 * | 4/2025 | Bächer | B25J 9/0081 |
| 2025/0139930 | A1 * | 5/2025 | He | G06V 10/806 |
| 2025/0249932 | A1 * | 8/2025 | Pourmohammadi Fallah | B60W 60/0015 |
| 2025/0272621 | A1 * | 8/2025 | Takác | G06Q 10/04 |
| 2025/0272723 | A1 * | 8/2025 | Takác | G06Q 30/0283 |
| 2025/0315759 | A1 * | 10/2025 | Buckland | G06N 3/084 |
| 2025/0375878 | A1 * | 12/2025 | Srinivasan | B25J 9/163 |
| 2025/0379275 | A1 * | 12/2025 | Mazzolo | H01M 10/482 |
| 2026/0028044 | A1 * | 1/2026 | Johnson | B60W 60/0011 |
| 2026/0109350 | A1 * | 4/2026 | Maleki | B60W 30/143 |
| 2026/0141669 | A1 * | 5/2026 | Osherov | B60T 7/22 |

FOREIGN PATENT DOCUMENTS

| | | | | |
|---|---|---|---|---|
| DE | 102019214931 | A1 | 4/2021 | |
| DE | 102020209214 | A1 | 9/2023 | |
| EP | 4086813 | A1 | 11/2022 | |
| WO | 2020119004 | A1 | 6/2020 | |
| WO | WO-2021213616 | A1 * | 10/2021 | G06N 7/01 |

OTHER PUBLICATIONS

Pathare, Deepthi, Leo Laine, and Morteza Haghir Chehreghani. "Multi-Objective Reinforcement Learning for Efficient Tactical Decision Making for Trucks in Highway Traffic." arXiv preprint arXiv:2601.18783 (2026). (Year: 2026).*

Pathare, Deepthi, Leo Laine, and Morteza Haghir Chehreghani. "Improved tactical decision making and control architecture for autonomous truck in sumo using reinforcement learning." 2023 IEEE international conference on big data (BigData). IEEE, 2023. (Year: 2023).*

Mukadam, Mustafa, et al. "Tactical decision making for lane changing with deep reinforcement learning." (2017). (Year: 2017).*

Das, Lokesh Chandra, and Myounggyu Won. "Saint-acc: Safety-aware intelligent adaptive cruise control for autonomous vehicles using deep reinforcement learning." International Conference on Machine Learning. PMLR, 2021. (Year: 2021).*

Hoel, Carl-Johan, Krister Wolff, and Leo Laine. "Tactical decision-making in autonomous driving by reinforcement learning with uncertainty estimation." 2020 IEEE intelligent vehicles symposium (IV). IEEE, 2020. (Year: 2020).*

CN-117818615-A machine translation (Year: 2024).*

Das et al., "SAINT-ACC: Safety-Aware Intelligent Adaptive Cruise Control for Autonomous Vehicles Using Deep Reinforcement Learning," Proceedings of the 38th International Conference on Machine Learning, PMLR 139, 2021, 11 pages.

De Jong, G. et al., "National and International Freight Transport Models: An Overview and Ideas for Future Development," Transport Reviews, vol. 24, Issue 1, Jan. 2004, Taylor & Francis Ltd, 22 pages.

Desjardins, "Cooperative Adaptive Cruise Control: A Reinforcement Learning Approach," IEEE Transactions on Intelligent Transportation Systems, vol. 12, Issue 4, Dec. 2011, first published Jun. 2011, IEEE, pp. 1248-1260.

El Sallab, A. et al., "Deep Reinforcement Learning Framework for Autonomous Driving," arXiv:1704.02532v1 [stat.ML], Apr. 8, 2017, 7 pages.

Erdmann, J., "Lane-Changing Model in SUMO," Proceedings of the SUMO2014, May 2014, 12 pages.

Grislis, A., "Longer Combination Vehicles and Road Safety," Transport, vol. 25, No. 3, 2010, pp. 336-343.

Hoel, C.J., "Source Code for 'Tactical Decision-Making in Autonomous Driving by Reinforcement Learning with Uncertainty Estimation,'" 2020, available online: [URL: https://github.com/carljohanhoel/BayesianRLForAutonomousDriving], 6 pages.

Hoel, C.J., et al., "Tactical Decision-Making in Autonomous Driving by Reinforcement Learning with Uncertainty Estimation," Intelligent Vehicles Symposium (IV), Oct. 20-23, 2020, Las Vegas, NV, IEEE, 7 pages.

(56) References Cited

OTHER PUBLICATIONS

Hou, J. et al., "Large-Scale Vehicle Platooning: Advances and Challenges in Scheduling and Planning Techniques," Engineering, vol. 28, Sep. 2023, Elsevier, pp. 26-48.
Jimenez, F. et al., "Advanced Driver Assistance System for Road Environments to Improve Safety and Efficiency," Transportation Research Procedia 14, Dec. 2016, Elsevier, pp. 2245-2254.
Kiran, B. et al., "Deep Reinforcement Learning for Autonomous Driving: A Survey," IEEE Transactions on Intelligent Transportation Systems, vol. 23, Issue 6, Jun. 2022, first published Feb. 2021, IEEE, pp. 4909-4926.
Krauss, S., et al., "Metastable States in a Microscopic Model of Traffic Flow," Physical Review E, vol. 55, Issue 5, May 1997, American Physical Society, 8 pages.
Lin, Y. et al., "Comparison of Deep Reinforcement Learning and Model Predictive Control for Adaptive Cruise Control," IEEE Transactions on Intelligent Vehicles, vol. 6, Issue 2, Jun. 2021, first published Jul. 2020, IEEE, pp. 221-231.
Lopez, P. et al., "Microscopic Traffic Simulation using SUMO," International Conference on Intelligent Transportation Systems (ITSC), Nov. 4-7, 2018, Maui, Hawaii, USA, IEEE, pp. 2575-2582.
Moreno, G. et al., "Stability of Long Combination Vehicles," International Journal of Heavy Vehicle Systems, vol. 25, No. 1, Jan. 2018, Inderscience Enterprises Ltd., pp. 113-131.
Nilsson, P. et al., "On actions of long combination vehicle drivers prior to lane changes in dense highway traffic—A driving simulator study," Transportation Research Part F: Traffic Psychology and Behaviour, vol. 55, May 2018, pp. 25-37.
Pathare, D. et al., "Improved Tactical Decision Making and Control Architecture for Autonomous Truck in SUMO Using Reinforcement Learning," 2023 IEEE International Conference on Big Data (BigData), Dec. 15-18, 2023, Sorrento, Italy, IEEE, 6 pages.
Pathare, D., "Source Code for Improved Tactical Decision Making and Control Architecture for Autonomous Truck in SUMO Using Reinforcement Learning," available from Sep. 21, 2023 online: [URL: https://github.com/deepthi-pathare/Autonomous-truck-sumo-gym-env/], 2 pages.
Raffin, A. et al., "Stable-Baselines3: Reliable Reinforcement Learning Implementations." Journal of Machine Learning Research, vol. 22, Nov. 2021, 8 pages.
Schulman, J. et al., "Proximal Policy Optimization Algorithms," arXiv:1707.06347v2 [cs.LG], Aug. 28, 2017, 12 pages.
Shalev-Schwartz, S. et al., "Safe, Multi-Agent, Reinforcement Learning for Autonomous Driving," arXiv:1610.03295v1 [cs.AI], Oct. 11, 2016, 13 pages.
Shaout, A. et al., "Advanced Driver Assistance Systems—Past, Present and Future," 2011 Seventh International Computer Engineering Conference (ICENCO'2011), Dec. 27-28, 2011, Cairo, Egypt, IEEE, 11 pages.
Sutton, R.S. et al., "Reinforcement Learning: An Introduction," Second Edition, The MIT Press: Cambridge, Massachusetts London, England, 2018, 548 pages.
Svensson, H. et al., "Utilizing Reinforcement Learning for de Novo Drug Design," arXiv:2303.17615v2 [q-bio.BM], Jan. 30, 2024, 40 pages.
Treiber, M. et al., "Congested Traffic States in Empirical Observations and Microscopic Simulations," Physical Review E 62, Feb. 2000, pp. 1805-1824.
Xiao, L. et al., "A Comprehensive Review of the Development of Adaptive Cruise Control Systems," Vehicle System Dynamics, vol. 48, No. 10, Oct. 2010, Taylor & Francis, pp. 1167-1192.
Yang, D. et al., "A Cellular Automata Model for Car-Truck Heterogeneous Traffic Flow Considering the Car-Truck Following Combination Effect." Physica A: Statistical Mechanics and its Applications, vol. 424, Apr. 2015, pp. 62-72.
Yang, J. et al., "Longitudinal Tracking Control of Vehicle Platooning Using DDPG-Based PID," 2020 4th CAA International Conference on Vehicular Control and Intelligence (CVCI), Dec. 18-20, 2020, Hangzhou, China, IEEE, pp. 656-661.
Zhao, D. et al., "A Supervised Actor-Critic Approach for Adaptive Cruise Control," Soft Computing, vol. 17, published online Aug. 2013, Springer, pp. 2089-2099.
Extended European Search Report for European Patent Application No. 23197734.9, mailed May 23, 2024, 8 pages.

* cited by examiner

METHOD AND COMPUTER SYSTEM FOR MULTI-LEVEL CONTROL OF MOTION ACTUATORS IN AN AUTONOMOUS VEHICLE

PRIORITY APPLICATIONS

The present application claims priority to European Patent Application No. 23197734.9, filed on Sep. 15, 2023, and entitled "METHOD AND COMPUTER SYSTEM FOR MULTI-LEVEL CONTROL OF MOTION ACTUATORS IN AN AUTONOMOUS VEHICLE," which is incorporated herein by reference in its entirety.

TECHNICAL FIELD

The present disclosure relates to the field of automatic vehicle control, and tactical decision-making specifically. In particular aspects, the disclosure relates to a multi-level control architecture suitable for controlling an ego vehicle in a multi-lane driving environment where non-controlled surrounding vehicles are present. The teachings to be disclosed herein can be applied to heavy-duty vehicles, such as trucks, buses, and construction equipment, among other vehicle types. Although the description may refer to a particular vehicle or vehicle type, the applicability of this disclosure is not so restricted.

BACKGROUND

The efficiency and safety of transport networks have a huge impact on the socio-economic development of the globe. A significant part of this network is freight transport, of which more than 70% is carried out by trucks (De Jong, Gunn, and Walker 2004). The modeling of these complex networks, with a particular focus on traffic scenarios, including trucks and their Total Cost of Operation (TCOP) is thus of paramount importance to developing sustainable traffic solutions.

At a mesoscopic scale, a truck can significantly affect the surrounding traffic (Moreno et al. 2018), primarily due to its comparatively larger size and length (D. Yang et al. 2015). It also needs more cooperation from surrounding vehicles in order to perform specific maneuvers, such as lane changes in multiple-lane dense traffic scenarios (Nilsson et al. 2018). Further, if it is a Long Combination Vehicle (LCV), its influence on the safety and evolution of the surrounding traffic can be substantial (Grislis 2010).

Modern vehicles, including trucks, are equipped with a number of features that enhance their performance at different levels. For example, modern trucks operate in connected networks, constantly exchanging data related to their location and performance with their clients. They are also equipped with Advance Driver Assistance Systems (ADAS) to assist the driver with complex driving tasks and to enhance safety (Shaout, Colella, and Awad 2011; Jiménez et al. 2016). Adaptive Cruise Control (ACC) is such a driver assistance function that provides longitudinal control and maintains a safe distance with the vehicle ahead (Xiao and Gao 2010).

Artificial Intelligence (AI) and Machine Learning have revolutionized the connectivity and autonomy of vehicles, including trucks. With the integration of sensors, cameras, and sophisticated onboard systems, machine-learning algorithms can analyze vast amounts of real-time data, allowing trucks to make intelligent decisions on the road. The continuous advancements in machine learning continue to push the boundaries of connectivity and autonomy, transforming the trucking industry towards a more efficient and intelligent future.

A widely used machine-learning framework in the context of autonomous systems is Reinforcement Learning (RL). RL overcomes the challenges of traditional search based methods, such as A* search, which lack the ability to generalize to unknown situations in a non-deterministic environment and which may be computationally expensive (Sutton and Barto 2018). RL is being increasingly used for solving complex problems related to autonomous driving, such as navigation, trajectory planning, collision avoidance, and behavior planning (Sallab et al. 2017; Shalev-Shwartz, Shammah, and Shashua 2016; Kiran et al. 2021). The application of this framework to autonomous trucks is a relatively new area of research. An important contribution in this direction is the work (C.-J. Hoel, Wolff, and Laine 2020), which implements an RL framework for autonomous truck driving in SUMO. They study how a Bayesian RL technique, based on an ensemble of neural networks with additional randomized prior functions (RPF), can be used to estimate the uncertainty of decisions in autonomous driving. On the other hand, more results exist when we consider autonomous driving of passenger cars. The paper (Desjardins and Chaib-draa 2011) develops a cooperative adaptive cruise control (CACC) using RL for securing longitudinal following of a front vehicle using vehicle-to-vehicle communication. The CACC system has a coordination layer that is responsible for the selection of high-level actions, e.g., lane changing or secure vehicle following. The action layer, which is a policy-gradient RL agent, must achieve this action by selecting the appropriate low-level actions that correspond to the vehicle's steering, brakes and throttle. Another work (Zhao, Wang, and Liu 2013) proposed a Supervised Actor-Critic approach for optimal control of ACC. Their framework contains an upper level controller based on SAC, which chooses desired acceleration based on relative velocity and distance parameters of leading and following vehicles. A low-level controller receives the acceleration signal and transfers it to the corresponding brake and/or throttle control action. In reference (Lin, McPhee, and Azad 2021), the authors developed a Deep Reinforcement Learning framework for ACC and compared the results with Model Predictive Control. In all these studies, the RL agent performs step control of acceleration or other driving maneuvers, such as braking and steering. For this reason, it can take a longer time for the agent to reach maximum speed even though there is no leading vehicle in front, making the process apparently inefficient.

There is only limited work done where the RL agent is trained to learn high level actions such as choosing the safe gap with the leading vehicle and the actual speed control is performed by a low level controller. The research paper (Das and Won 2021) develops a similar system that aims to achieve simultaneous optimization of traffic efficiency, driving safety, and driving comfort through dynamic adaptation of the inter-vehicle gap. It suggests a dual RL agent approach, in which the first RL agent is designed to find and adapt the optimal time-to-collision (TTC) threshold based on rich traffic information, including both macroscopic and microscopic traffic data obtained from the surrounding environment and the second RL agent is designed to derive an optimal inter-vehicle gap that maximizes traffic flow, driving safety, and comfort at the same time. In (J. Yang et al. 2020), the authors develop a Deep Deterministic Policy Gradient-Proportional Integral Derivative (DDPG-PID) controller for longitudinal control of vehicle platooning. They use the DDPG algorithm to optimize the $K_p$, $K_d$ and $K_i$ constants for the PID controller which controls the desired speed. These works mainly focus on longitudinal control of the vehicles in a platoon, and the effects of lane change maneuvers are not studied sufficiently.

The present disclosure addresses speed control and assisted lane-change maneuvers for an autonomous truck in a multilane environment. Work relating to tactical decision-making in a similar scenario has been published in (C.-J. Hoel, Wolff, and Laine 2020), (C.-J. E. Hoel 2020) and WO2021213616A1. In these earlier disclosures, the decision-making regarding speed control and lane changes is done by an RL agent.

SUMMARY

One objective of the present disclosure is to make available a vehicle control method allowing more efficient control of motion actuators in an autonomous vehicle. A further objective is to provide such a vehicle control method where the decision-making efforts by machine learning is offloaded by classic automatic control. A further objective is to provide such a vehicle control method allowing more efficient navigation in a multilane driving environment. A still further objective is to provide a computer system and a computer program for this purpose.

In a first aspect of the present disclosure, there is provided a computer system for controlling at least one motion actuator in an autonomous vehicle. The computer system comprises processing circuitry which implements, on the one hand, a feedback controller configured to sense an actual motion state x of the vehicle and determine a machine-level instruction u to the motion actuator for approaching a setpoint motion state x* and, on the other hand, a reinforcement-learning (RL) agent trained to perform decision-making regarding the setpoint motion state x*, in particular, to perform decision-making regarding the setpoint motion state x* on the basis of a sensed state s of the ego vehicle and any surrounding vehicles. According to the first aspect, the processing circuitry is further configured to apply decisions by the RL agent as the setpoint motion state x* of the feedback controller and to apply the machine-level instruction u to the motion actuator.

In a second aspect, there is provided a method of controlling at least one motion actuator in an autonomous vehicle. The method comprises: providing a feedback controller, which is configured to sense an actual motion state x of the vehicle and determine a machine-level instruction u to the motion actuator for approaching a setpoint motion state x*; providing an RL agent trained to perform decision-making regarding the setpoint motion state x*, in particular, to perform decision-making regarding the setpoint motion state x* on the basis of a sensed state s of the ego vehicle and any surrounding vehicles; applying decisions by the RL agent as the setpoint motion state x* of the feedback controller; and applying the machine-level instruction u to the motion actuator. The method according to the second aspect may be embodied as a computer-implemented method. Notably, one or more of the steps of the method may be performed using processing circuitry of a computer system.

In further aspects, there is provided a computer program containing instructions for causing a computer system to carry out the method of the second aspect. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

In other words, the above-stated problem is addressed by a serial arrangement of an RL agent and a feedback controller, wherein the decisions by the RL agent are applied as the setpoint motion state x* of the feedback controller, which in turns provides the machine-level instruction u to be applied to the motion actuator. Advantageously, this offloads the RL agent of such decision-making which can be delegated to a conventional (or classic) feedback controller, notably to a feedback controller that is not based on machine-learning technology. Experimental data to be presented below demonstrates the resulting increase in performance.

The aspects of the disclosure outlined above are applicable, in particular, to highway driving maneuvers in dense traffic. Dense traffic may signify that inter-vehicle distances are smaller than the length of a typical vehicle. The aspects are applicable, in particular, to traffic without any vehicle-to-vehicle communication, whether between the ego vehicle and the surrounding vehicles or among the surrounding vehicles.

Optionally in some examples, including in at least one preferred example, the computer system according to the first aspect is installed in a vehicle.

Optionally in some examples, including in at least one preferred example, the computer system according to the first aspect includes two feedback controllers, which are respectively configured for controlling a longitudinal motion actuator and a lateral motion actuator, and further includes an RL agent which is trained to perform joint decision-making regarding a setpoint motion state of the longitudinal motion actuator and regarding a setpoint motion state of the longitudinal motion actuator. This advantageously reduces the total computational effort since only one RL agent (e.g., a single neural network) needs to be trained. Further, the RL agent is afforded a greater degree of control over the system as a whole, which allows it to balance different contributions against each other; notably the total cost of operation (TCOP) can be efficiently controlled. A still further benefit is the greater foresight and degree of intelligent coordination in and around the ego vehicle.

In particular ones of these examples, the two feedback controllers include, respectively, an adaptive cruise controller (ACC) and a lane-change assistant. A setpoint motion state of the ACC may be the so-called time-to-collision (TTC). The TTC—or by an equivalent term the desired time gap—represents the time which would elapse before the ego vehicle collided with the leading vehicle (i.e., vehicle in front of the ego vehicle) in a hypothetic scenario where the leading vehicle stopped immediately. A technical benefit may include that RL agent, when deciding on a lane change, may concurrently adjust the TTC so as to match the traffic conditions in the new lane, so that the ego vehicle may enter the new lane more harmoniously. Traffic conditions in this regard may include the average inter-vehicle distance, the vehicle type and/or the vehicle density in the new lane.

Optionally in some examples, including in at least one preferred example, the computer system according to the first aspect includes an RL agent trained to perform decision-making based on a state $s \in \mathcal{S}$ which is not included in the vehicle's actual motion state x sensed by the feedback controller. The state s may relate to the ego vehicle, to vehicles surrounding the ego vehicle in a driving environment, or both of these. A technical benefit may include that the relatively richer state s is fed to the RL agent only, whereas the feedback controller has a relatively lighter computational task in that it processes merely the relatively leaner motion state x of the vehicle. For example, the state s fed to the RL agent may include motion states of the surrounding vehicles, as well as turning indicators status of the ego vehicle and surrounding vehicles.

The RL agent in the computer system according to the first aspect can be configured with any learning algorithms that supports a discrete action space. Optionally in some examples, including in at least one preferred example, the RL agent is configured with one of the following learning algorithms: deep Q network (DQN), advantage actor critic (A2C), proximal policy optimization (PPO). The technical benefits of each of these will be demonstrated below with reference to experimental data.

In the terminology of the present disclosure, a "motion actuator" is a technical component for applying a linear or angular acceleration on the vehicle, such as a drive motor, a brake, a steering arrangement, a drivetrain component, etc. A "motion state" refers, in the present disclosure, to a physical or technical variable describing the position, pose or movements of the vehicle, e.g., a lane number, a speed and a time-to-collision (TTC). A "machine-level instruction" signifies an input variable to a motion actuator, such as an acceleration torque, a braking torque, a left/right differential torque, a gear and a steering angle.

In the present disclosure, a "vehicle" can refer to a vehicle combination. In particular, the ego vehicle may be a combination of two or more vehicle units, such as a heavy vehicle combination (HVC).

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless this is explicitly stated.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Aspects and embodiments are now described, by way of example, with reference to the accompanying drawings, on which.

DETAILED DESCRIPTION

I. Outline

Figure 1A:
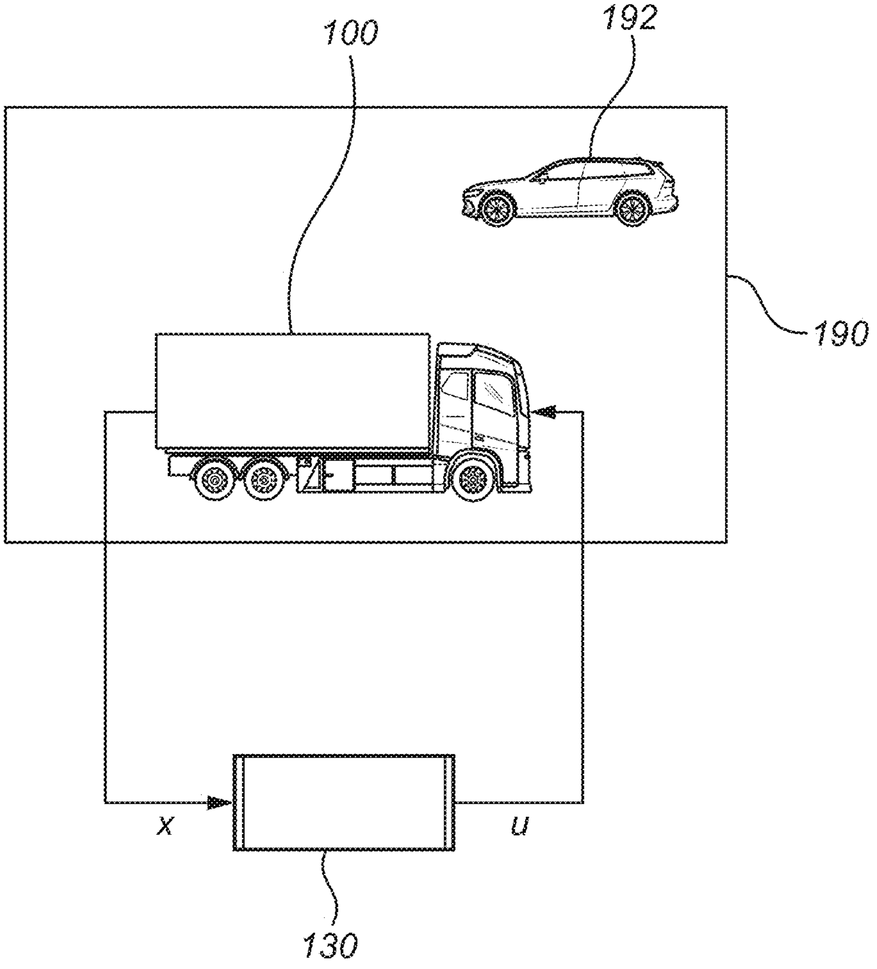
FIG. 1A illustrates a baseline vehicle control architecture.

The detailed description set forth below provides information and examples of the disclosed technology with sufficient detail to enable those skilled in the art to practice the disclosure.

In some aspects of the present disclosure, the inventors develop ACC together with lane change maneuvers for an autonomous truck in a highway scenario. The inventors first develop a baseline architecture for tactical decision-making and control based on the previous work disclosed in (C.-J. Hoel, Wolff, and Laine 2020), (C.-J. E. Hoel 2020) and WO2021213616A1. It is recalled that the decision-making task of an autonomous vehicle is commonly divided into strategic, tactical and operational decision-making, also called navigation, guidance and stabilization. In short, tactical decisions refer to high-level, often discrete, decisions, such as when to change lanes on a highway, or whether to stop or go at an intersection. Here, the decision-making related to speed control and lane changes is done by a reinforcement learning (RL) agent.

Reinforcement learning is a branch of machine learning where an agent acts in an environment and tries to learn a policy $\pi$ that maximizes a cumulative reward function. Reference is made to the textbook R. S. Sutton and A. G. Barto, *Reinforcement Learning: An Introduction*, $2^{nd}$ ed., MIT Press (2018). The policy $\pi(s)$ defines which action a to take in each state s. When an action is taken, the environment transitions to a new state s' and the agent receives a reward r. The reinforcement learning problem can be modeled as a Markov Decision Process (MDP), or possibly as a partially observable MDP (POMDP) approximated as MDP, which is defined by the tuple ($\mathcal{S}$; $\mathcal{A}$ ; T; R; $\gamma$), where $\mathcal{S}$ is the state space, $\mathcal{A}$ is the action space, T is a state transition model (or evolution operator), R is a reward model, and $\gamma$ is a discount factor. This model can also be considered to represent the RL agent's interaction with the training environment. At every time step t, the goal of the agent is to choose an action a that maximizes the discounted return, $$R_t = \sum_{k=0}^{\infty} \gamma^k r_{t+k}.$$

In Q-learning, the agent tries to learn the optimal action-value function Q*(s,a), which is defined as $$Q^*(s, a) = \max_{\pi} \mathbb{E}[R_t \mid s_t = s, a_t = a, \pi].$$

From the optimal action-value function, the policy is derived as per $$\pi(s) = \underset{a}{\operatorname{argmax}} Q^*(s, a).$$

Starting from the baseline, RL-based vehicle control architecture according to Hoel et al., the inventors show how adding relevant features to the observation space improves the performance of the agent. Then, the inventors report of training a refined architecture where the high-level decision-making and low-level control actions are separated between the RL agent and low-level controllers based on physical models. Compared to the existing architectures in the literature, the RL agent in the refined architecture only needs to learn a policy to choose high level actions, such as an inter-vehicle gap to be maintained. Interestingly, the inventors find that this optimized action space improves the learning compared to speed control actions. Finally, the inventors design a realistic reward function based on TCOP, which includes explicit costs for energy consumption and human resources.

The experimental results are obtained using Simulation of Urban Mobility (SUMO) (Lopez et al. 2018), a simulation platform for the conceptual development of autonomous vehicles. Source code for the tailored RL environment based on SUMO, which the inventors have developed for heavy vehicle combination driving in highway traffic, will be published later (Pathare 2023).

II. Vehicle and Traffic Model

Figure 3:
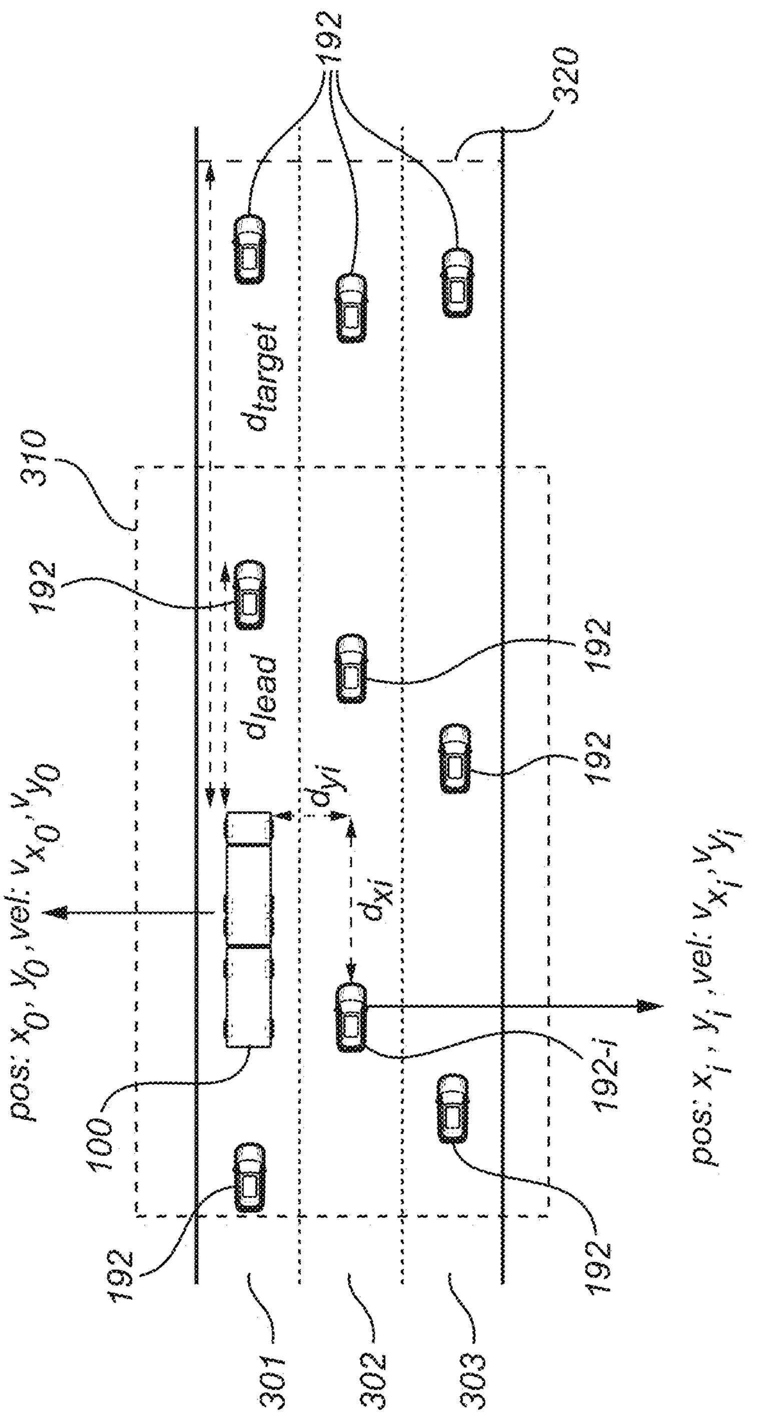
FIG. 3 is a top view of a multi-lane driving environment, in which some geometric quantities are introduced.

In the present disclosure, the inventors consider a dynamic highway traffic environment with multiple lanes 301, 302, 303, in which an autonomous or semi-autonomous truck (ego vehicle) 100 and passenger cars (surrounding vehicles) 192 move, as shown in FIG. 3. Lane changes between adjacent pairs of the parallel lanes 301, 302, 303 is permitted. In a per se known manner, the ego vehicle 100 is equipped with technical components for applying linear or angular accelerations on the vehicle, such as electric or combustion-based drive motors, regenerative or dissipative brakes, steering arrangements. At least some of the components form part of a drivetrain of ego vehicle 100. Components with these characteristics may be referred to as motion actuators. In addition to motion actuators and other actuators, the ego vehicle 100 may include internal sensors for sensing various conditions of the vehicle itself and external sensors for sensing positions and behavior of surrounding vehicles. The dashed rectangle 310 in FIG. 3 represents the approximate range of the external sensors of the ego vehicle 100.

The maximum speed of the ego vehicle is set to be 25 m/s. Furthermore, fifteen passenger cars with speeds between 15 m/s and 35 m/s are simulated based on the default Krauss car-following model (Krauss, Wagner, and Gawron 1997) and further based on the LC2013 lane change model (Erdmann 2014) in SUMO. The initial position and speed pattern of the surrounding vehicles is set randomly, which makes the surrounding traffic nondeterministic throughout the simulation. Starting from the initial position (which will be 800 m after initialization steps in SUMO), the ego vehicle is expected to reach the target 320 set at a distance of 3000 m. This means that the ego vehicle 100 has to drive 2200 m on the highway in each episode. An episode will also terminate if a hazardous situation such as a collision or driving outside the road happens, or if a maximum of 500 RL steps are executed. The observation or state of the environment at each step contains information about position, speed, and state of left/right indicators for ego vehicle and vehicles within the sensor range. In the simulations, a sensor range 310 of 200 m is assumed.

In the simulations, a vehicle model with the following the observables of the ego vehicle 100 is used:

1. Longitudinal speed ($v_{x0}$)
2. Lane change state (positive or negative sign of the lateral speed, $\operatorname{sgn}(v_{y0})$)
3. Lane number
4. State of left turning indicator (on or off)
5. State of right turning indicator
6. Distance to leading vehicle ($d_{lead}$)

Each of the surrounding vehicles, to the extent it is located in the sensor range 310, is modelled with a different set of observables. For the $i^{th}$ vehicle, the model includes:

1. Relative longitudinal distance from ego vehicle ($d_{xi}$)
2. Relative lateral distance from ego vehicle ($d_{yi}$)
3. Relative longitudinal speed with respect to ego vehicle ($v_{xi}-v_{x0}$)
4. Lane change state (positive or negative sign of the lateral speed sgn ($v_{yi}$))
5. Lane number
6. State of left turning indicator
7. State of right turning indicator Baseline vehicle control architecture. The baseline architecture in the present disclosure is inspired by (C.-J. Hoel, Wolff, and Laine 2020) and is illustrated in FIG. 1A. Here, the decision-making is done solely by an RL agent 130, with a frequency of 1 second. The driving environment 190 may be a simulated or real environment, which is represented as state x. The action space for the RL agent 130 is discrete. The actions indicated by the control signal u include longitudinal actions and lateral actions. Longitudinal actions are speed changes of 0, 1, −1 or −4 m/s. Lateral actions are to stay on lane, change to left lane, or change to right lane.

In the present disclosure, the inventors compare the performance of this baseline architecture with the new architecture described below.

New vehicle control architecture. The new vehicle control architecture proposed herein includes a feedback controller 120 and an RL agent 130. The feedback controller 120 is configured to sense an actual motion state x of the vehicle and to determine a machine-level instruction u to the motion actuator for approaching a setpoint motion state x*. The RL agent 130 for its part is trained to perform decision-making regarding the setpoint motion state x*, and the value x* thus decided is applied as setpoint motion state of the feedback controller 120.

Figure 1B:
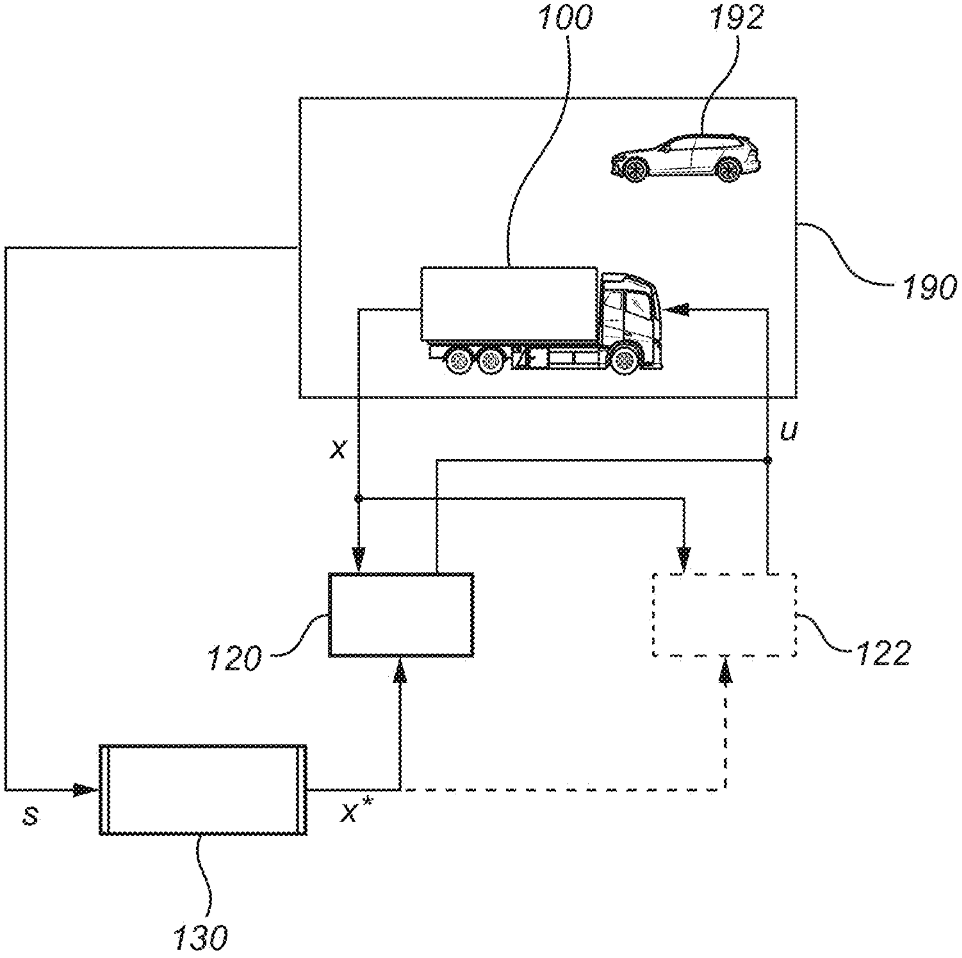
FIG. 1B a vehicle control architecture according to embodiments herein.

FIG. 1B shows an example where the new vehicle control architecture is applied to an automated truck driving framework. There are three main components: a high-level decision-making agent 130 based on RL, a low-level feedback controller 120 for longitudinal control (i.e., control of one or more longitudinal motion actuators) and a low-level controller 122 for lateral control. The RL agent chooses, based on the current state of the SUMO environment, a longitudinal action or a lateral action. The action space includes the following actions:

1. Set short time gap with leading vehicle (1s)
2. Set medium time gap with leading vehicle (2s)
3. Set long time gap with leading vehicle (3s)
4. Increase desired speed by 1 m/s
5. Decrease desired speed by 1 m/s
6. Maintain current desired speed and time gap
7. Change lane to left
8. Change lane to right The longitudinal action can be one of the following: set desired time gap (short, medium, or long), increment or decrement desired speed, or maintain the current time gap and desired speed. When the RL agent chooses one of these actions, the longitudinal controller will compute the acceleration of the ego vehicle based on an Intelligent Driver Model (IDM; see Treiber et al. 2000) given by $$\dot{v}_\alpha = \frac{dv_\alpha}{dt} = a\left(1 - \left(\frac{v_\alpha}{v_0}\right)^\delta - \left(\frac{s^*(v_\alpha, \Delta v_\alpha)}{s_\alpha}\right)^2\right)$$

$$\text{with } s^*(v_\alpha, \Delta v_\alpha) = s_0 + v_a T + \frac{v_a \Delta v_a}{2\sqrt{ab}}$$

where the index $\alpha$ refers to the ego vehicle 100 and $\alpha-1$ is the leading vehicle ahead of the ego vehicle 100. The real-valued exponent $\delta \geq 0$ may be used as a tuning parameter, with a default value of $\delta=4$. Letting $v_i$ denote the velocity, $x_i$ the longitudinal position, and $l_i$ the length of the vehicle, one obtains the net distance $s_\alpha := x_{\alpha-1} - x_\alpha - l_{\alpha-1}$ and the velocity difference $\Delta v_\alpha := v_\alpha - v_{\alpha-1}$. Among the further model parameters, $v_0$ represents desired velocity, $s_0$ minimum spacing, T desired time gap (TTC), a maximum acceleration, and b a desired maximum braking deceleration.

Here IDM uses the latest desired speed and time gap set by the RL agent. It computes a new acceleration for the truck and sets the resulting speed in SUMO every 0.1 s. This process continues for a total duration of 1 s, after which the RL agent chooses the next high-level action. Note that in the new architecture, the ACC mode is always activated for the truck by construction.

The lateral action is to change the truck's course to left or right lane. When the RL agent chooses a lateral action, the lateral controller initiates the lane change. Lane change is performed using the default LC2013 lane change model (Erdmann 2014) in SUMO. The lane width is set to 3.2 m, and the lateral speed of the truck is set to 0.8 m/s. Hence, in this example, it takes a total of 4 s to complete a lane change action, which corresponds to 40 SUMO time steps of 0.1 s duration each. Following this, the RL agent 130 chooses the next high-level action.

Reward functions. In order to conduct the experiments, the inventors have formulated two reward functions.

The basic reward function is designed so as to motivate the RL agent 130 to have the vehicle 100 drive at maximum speed and reach the target 320 without getting into any hazardous situations. This reward function is similar to that in (C.-J. Hoel, Wolff, and Laine 2020) except that a reward for reaching the target is added, whereas the penalty for emergency braking is not considered for simplicity. The reward at each time step is given by $$r(t) = \frac{v_t}{\text{max\_v}} - I_l P_l - I_c P_c - I_{nc} P_{nc} - I_o P_o + I_{tar} \frac{R_{tar}}{T}$$

Here $v_t$ is the velocity of the vehicle at time step t and max_v is the maximum velocity of the vehicle. I is an indicator function, which takes a value of 1 when the corresponding condition is satisfied, and P and R are the corresponding penalty and reward values respectively. The possible conditions are lane change l, collision c, near collision nc, driving outside the road o and reaching the target tar. T is the total time it takes to reach the target 320. The parameter values used are given in Table 1.

An enhanced version of the reward function is designed to provide the agent with more realistic goals similar to those of a human truck driver. In particular, the enhanced reward function may be considered to represent a total cost of operation (TCOP). As used herein TCOP may include both costs, rewards and penalties, and it may assume positive or negative values. Here, the inventors consider realistic cost or revenue values (in monetary units) for each component to explore whether the agent can learn a safe and cost-efficient driving strategy with this reward function. The reward at each time step is given by:

$$r(t) = -C_{el} e_t - C_{dr} \Delta t - I_l P_l - I_c P_c - I_{nc} P_{nc} - I_o P_o + I_{tar} R_{tar} W_{tar} \quad (1)$$

In this expression, $C_{el}$ is the per-unit cost of electric energy, et is the electric energy used at time step t, $C_{dr}$ is the driver cost and $\Delta t$ is the duration of a time step. The electric energy used during a time step t may be calculated as $$e_t = f_t v_t \Delta t, \quad (2a)$$

where $f_t$, the force applied by the motion actuators at time step $\Delta t$, is given by $$f_t = m a_t + \frac{1}{2} C_d A_f \rho_{air} v^2 + m g C_r + m g \sin\phi, \quad (2b)$$

where m is the mass of the vehicle, $C_d$ is the coefficient of air drag, $A_f$ is the frontal area, $\rho_{air}$ is the air density, $C_r$ is the coefficient of rolling resistance, g is the acceleration due to gravity and a is the acceleration of the vehicle at time step t. The inclination angle $\phi$ (slope) of the road is set to 0 in the simulations. The parameter values used are given in Table 1.

In the reward function (1), the penalties are defined as the average cost incurred during hazardous situations. The average cost considered here is the own risk payment which is the portion of an insurance claim made by the vehicle owner or the insured for any loss and or damage that occurs when submitting a claim. Similarly, the reward $R_{tar}$ denotes the revenue that can be achieved by the truck when it reaches the target 320 (i.e., completes an imaginary transport mission). Revenue is computed as the total expected cost with 20% profit in an ideal scenario where the truck drives with an average speed of 22 m/s and zero acceleration. The total length of travel is 2200 meters and hence the time to reach the target will be 100 s. Based on (2) and parameter values from Table 1, the total energy consumed can be computed as 1.85 kWh. Then, the total energy cost will be 1.85 kWh× 0.5=0.925 monetary units. The total driver cost for 100 s will be 1.39 units, and the total cost becomes 2.315 units. Further, adding the 20% profit gives a net revenue of 2.780 units, which is used in the reward function along with a weight $W_{tar}$.

The parameter values indicated in Table 1 may be used in the reward functions.

TABLE 1

Example parameter values for the reward functions

| Parameter | Basic reward function | TCOP reward function |
|---|---|---|
| $P_l$ | 1 | 0.1 |
| $P_c$ | 10 | 1000 units |
| $P_{nc}$ | 10 | 1000 units |
| $P_o$ | 10 | 1000 units |
| $R_{tar}$ | 100 | 2.78 units |
| $C_{el}$ | | 0.5 units per kWh |
| $C_{dr}$ | | 50 units/hour |
| Δt | | 1 s |
| m | | 40000 kg |
| $C_d$ | | 0.36 |
| $A_f$ | | 10 $m^2$ |
| $\rho_{air}$ | | 1.225 $kg/m^3$ |
| g | | 9.81 $m/s^2$ |
| $C_r$ | | 0.005 |

Reinforcement learning algorithms. The inventors study three RL algorithms for the decision making in baseline and new architectures. The implementations of these algorithms from the stable-baselines3 library with the default hyperparameters are used (Raffin et al. 2021).

1) Deep Q-Network (DQN): DQN is a reinforcement learning algorithm based on the Q-learning algorithm, which learns the optimal action-value function by iteratively updating estimates of the Q-value for each state-action pair. In DQN, the optimal action-value function in a given environment is approximated using a neural network. The corresponding objective function is given by $$L(\theta) = \mathbb{E}_{s,a,r,s'}\left[(y - Q(s, a; \theta))^2\right],$$

where θ represents the weights (and e.g. biases) of the Q-network, s and a are the state and action at time t, r is the immediate reward, s' is the next state, and $$y = r + \gamma \max_{a'} Q(s', a'; \theta^-)$$

is the target value. The target value is the sum of the immediate reward and the discounted maximum Q-value of the next state, where γ is the discount factor and $\theta^-$ represents the weights (and e.g. biases) of a target network with delayed updates. The objective function is to minimize the mean squared error between the estimated Q-value and the target value, which is then optimized using stochastic gradient descent.

Another improvement of DQN over the standard Q-learning approaches is the use of a replay buffer and target network. The agent uses the replay buffer to store transitions and samples from it randomly during training. This enables the efficient use of past experiences. The target network is a copy of the Q-network with delayed updates. Together with the replay buffer, it improves the learning stability of the model and help prevent over fitting.

2) Advantage Actor-Critic (A2C): A2C is a reinforcement learning algorithm that combines the actor-critic method with an estimate of the advantage function. In the actor-critic method, the agent learns two neural networks: an actor network that outputs a probability distribution over actions, and a critic network that estimates the state-value function. The actor network is trained to maximize the expected reward by adjusting the policy parameters, while the critic network is trained to minimize the difference between the estimated value function and the true value function. The advantage function is the difference between the estimated value and the baseline value for a given state-action pair. The corresponding objective function for A2C (surrogate objective function) is given by:

$$L(\theta) = \mathbb{E}_t\left[\log \pi_\theta(a_t \mid s_t)\hat{A}_t - \beta H(\pi_\theta(s_t))\right],$$

where θ represents the policy parameters, at is the action taken at time t in state $s_t$, $\hat{A}_t$ is the estimate of the advantage function, $H(\pi_\theta(s_t))$ is the entropy of the policy distribution, and β is a hyperparameter that controls the weight of the entropy regularization term. The goal is to maximize the expected reward by adjusting the policy parameters, while also maximizing the entropy of the policy distribution to encourage exploration.

3) Proximal Policy Optimization (PPO): PPO belongs to the family of policy gradient algorithms and has exhibited great potential in effectively addressing diverse RL problems (Schulman et al. 2017; Svensson et al. 2023). In addition, PPO benefits from simple yet effective implementation and a broad scope of applicability.

The PPO algorithm is designed to address the challenges such as the instability that can arise when the policies are rapidly updated. PPO works by optimizing a surrogate objective function that measures the difference between the updated policy and the previous one. The surrogate objective function of PPO is defined as the minimum of two terms: the ratio of the new policy to the old policy multiplied by the advantage function, and the clipped ratio of the new policy to the old policy multiplied by the advantage function. In mathematical terms, this function is given as, $$L^{CLIP}(\theta) = \hat{E}_t\left[\min\{r_t(\theta)\hat{A}_t, clip(r_t(\theta), 1-\epsilon, 1+\epsilon)\hat{A}_t\}\right]$$

where θ represents the policy parameters, $$r_t(\theta) = \frac{\pi_\theta(a_t \mid s_t)}{\pi_{\theta_{old}}(a_t \mid s_t)}$$

is the likelihood ratio between the current policy and the previous policy, the clipping function is defined as $$clip(x, x_{min}, x_{max}) = \begin{cases} x_{max}, & x_{max} < x, \\ x, & x_{min} \le x \le x_{max}, \\ x_{min}, & x < x_{min} \end{cases},$$

Ât is the estimated advantage of taking action $a_t$ in state $s_t$, and ϵ is a hyperparameter that controls the degree of clipping. The clipping term ensures that the policy update does not result in significant policy changes, which could otherwise destabilize the learning process. The PPO algorithm maximizes this objective function using stochastic gradient ascent to update the policy parameters. The expectation is taken over a batch of trajectories sampled from the environment.

III. Simulation Study

This section presents the results from different experiments conducted on the SUMO simulation platform using the baseline and new architectures with different RL algorithms. The source code used to implement the RL environment for conducting these experiments will later be made available on GitHub (Pathare 2023). The experiments are conducted on a Linux cluster that consists of 28 CPUs with model name Intel® Xeon® CPU E5-2690 v4 with a clock frequency of 2.60 GHz. The average time elapsed for training the new architecture with DQN, A2C and PPO for $10^6$ time steps is 12528 s (3 h 28 min), 13662 s (3 h 47 min), 14124 s (3 h 55 min) respectively.

Figure 5:
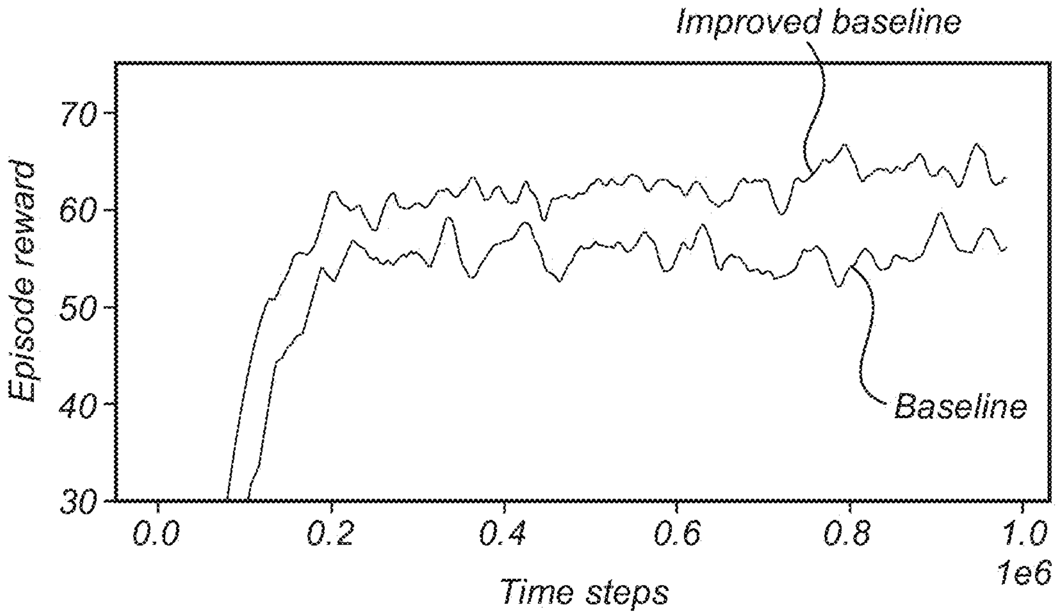
FIG. 5 is a comparison of episode rewards in the baseline vehicle control architecture and an improved variant of the baseline vehicle control architecture by which the state space S has been extended with a leading-vehicle distance.

Performance improvement based on selection of states. A first trial aims to show how the performance can be improved by adding relevant features to the observation space. As mentioned in section II, the state space includes position, speed, and lane-change information of the ego vehicle 100 and the surrounding vehicles 192. In this experiment, the performance of the baseline architecture is compared with an improved variant where the distance to the leading vehicle has been added as an explicit feature to the above-described state space. The basic reward function with the PPO algorithm is used in both cases. The learning curve of average reward over five realizations is shown in FIG. 5, and the evaluation metrics (average of 5 validations with 100 episodes each) are shown in Table 2.

TABLE 2

Evaluation of baseline architecture and improved baseline architecture with leading vehicle distance in state space

| Evaluation metric | Baseline architecture | Improved baseline architecture |
|---|---|---|
| Reached target successfully | 61% | 70.6% |
| Driven successfully, but not reached target 320 within maximum number of steps | 0% | 0% |
| Terminated by collision or driving outside road | 39% | 29.4% |
| Average speed | 18.17 m/s | 19.43 m/s |
| Average distance travelled | 1503.93 m | 1667.86 m |
| Average executed steps | 88.43 | 89.65 |

The average rewards and the evaluation metrics clearly show that the performance has improved by adding the distance to the leading vehicle as a feature in the state. The collision rate is considerably reduced and the average speed of the ego vehicle 100 is slightly increased. It is noted that the leading vehicle distance was already available in the observation space among the properties of surrounding vehicles. The present results show that explicitly adding the leading vehicle distance as a separate feature helps the agent to learn better how to control the speed with respect to the leading vehicle and avoid forward collisions.

Figure 6A:
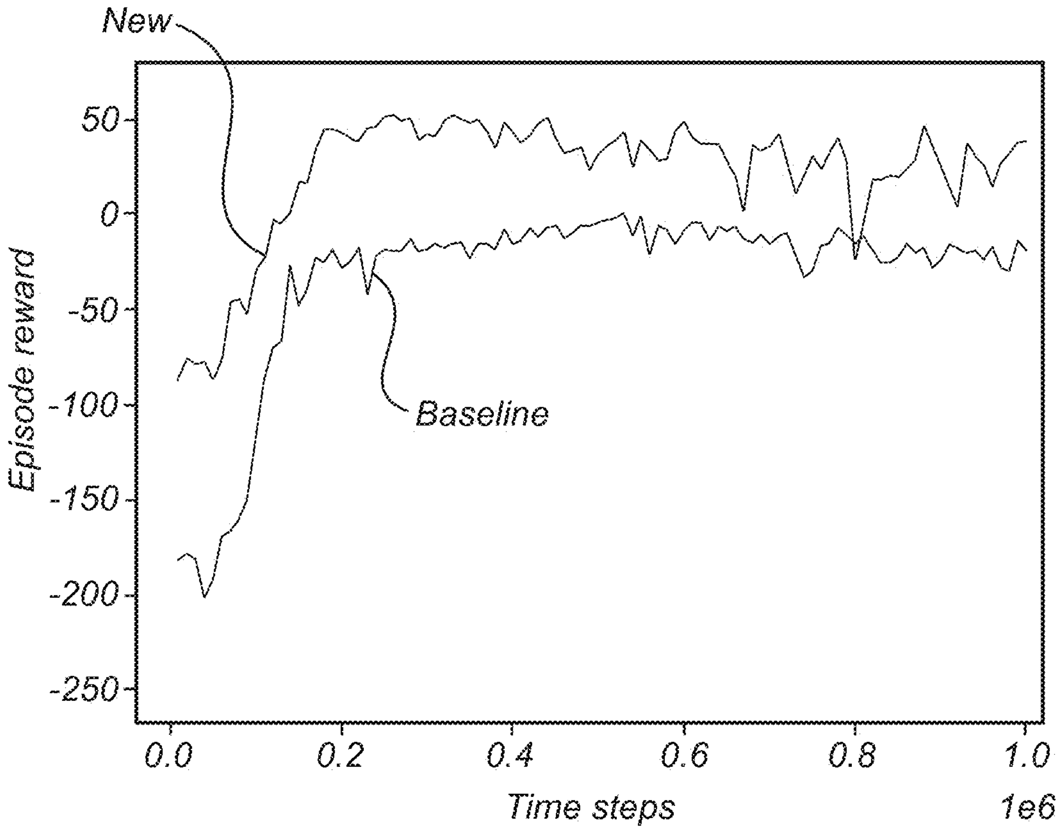
FIGS. 6A-6C show comparisons of average episode reward in the baseline vehicle control architecture and the novel vehicle control architecture proposed herein, in respective implementations where DQN (FIG. 6A), A2C (FIG. 6B) and PPO (FIG. 6C) is used.
Figure 6B:
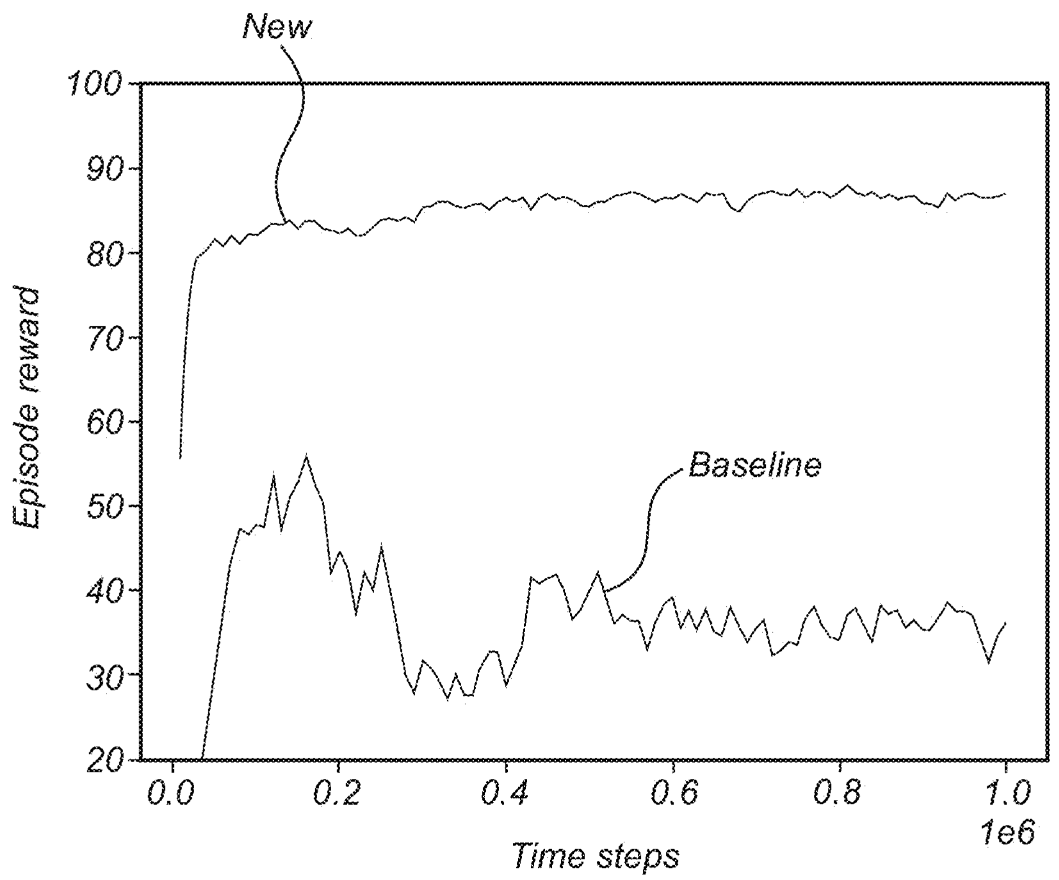
Figure 6C:
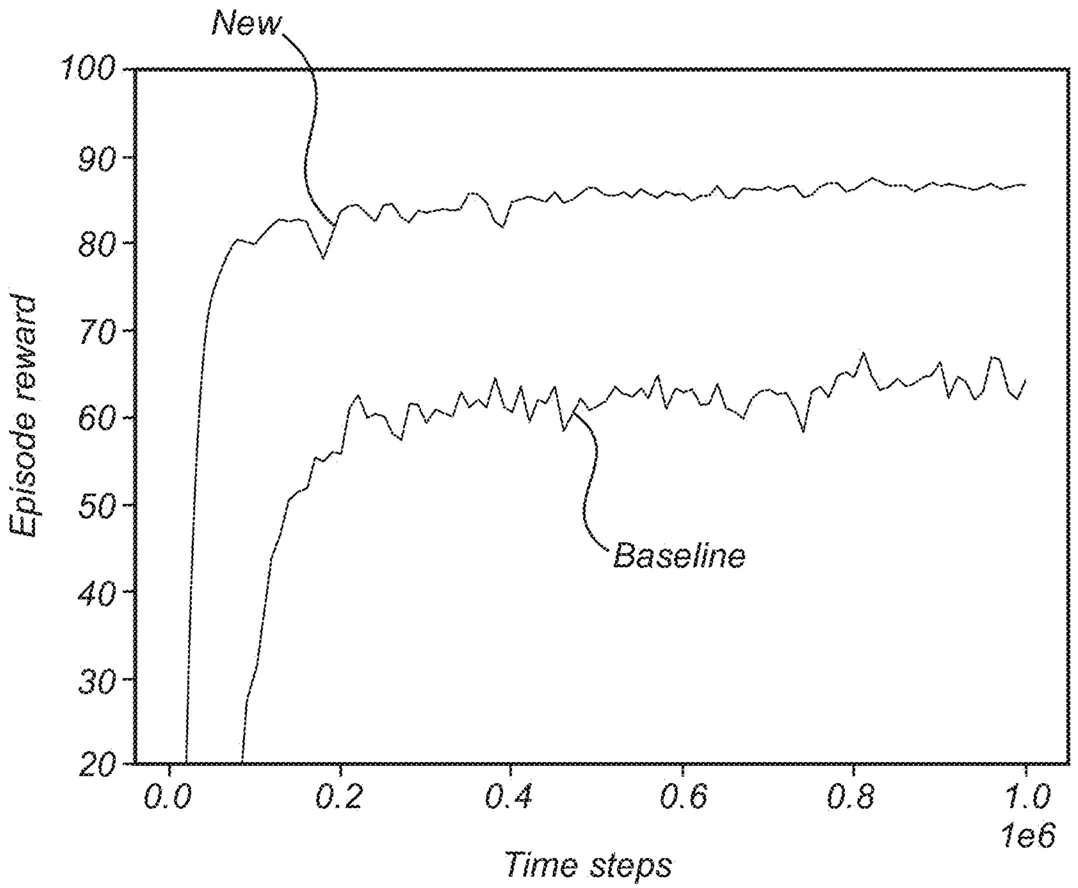

Performance comparison of baseline architecture and new architecture. In a second trial, the performance of the proposed new architecture shown in FIG. 1B is compared with the baseline framework shown in FIG. 1A using different RL algorithms. For both architectures, an observation space including leading vehicle distance and the basic reward function are used. However, the new architecture introduces a low-level controller (feedback controllers 120, 122) based on a physical model to perform speed control actions. FIGS. 6A-6C show the comparison of average episode rewards in both architectures for different RL algorithms. It can be seen that the new architecture outperforms the baseline regardless of the chosen RL algorithm. DQN obtains lowest average rewards. PPO obtains highest average reward in baseline architecture whereas both PPO and A2C shows similar performance in the new architecture.

As PPO gives consistent performance in both architectures, it is used for further validation. More precisely, SUMO-controlled simulation of an ego vehicle using the default Krauss car-following model have been considered for evaluation. The validation results in Table 3 clearly show that the new architecture has improved the performance compared to the baseline architecture.

TABLE 3

Evaluation of baseline architecture and new architecture

| Evaluation metric | Krauss-model based simulation | Baseline architecture | New architecture |
|---|---|---|---|
| Reached target successfully | 96% | 70.6% | 97.8% |
| Driven successfully, but not reached target 320 within maximum number of steps | 0% | 0% | 0.6% |
| Terminated by collision or driving outside road | 4% | 29.4% | 1.6% |
| Average speed | 22.65 m/s | 19.43 m/s | 18.56 m/s |
| Average distance travelled | 2136.62 m | 1667.86 m | 2178.37 m |
| Average executed steps | 94.95 | 89.65 | 128.75 |

More precisely, the collision rate is significantly reduced from 29.4% to 1.6%. The slight decrease in the average speed of the new framework is negligible when considering the improvement in safety. The reduced collision rate also explains why there is an increase in the average travelled distance and average executed steps.

Analysis of TCOP-based reward. In a final trial, the TCOP-based reward function is applied to the new vehicle control architecture in order to assess whether the RL agent 130 can successfully acquire a driving strategy that is both safe and cost-efficient. The episodic reward is evaluated with varying weights $W_{tar}$ assigned to the target completion reward $R_{tar}$, and the results are shown in Table 4.

TABLE 4

Evaluation of new architecture with TCOP-based reward function for different weights $W_{tar}$

| Evaluation metric | $W_{tar} = 1$ | $W_{tar} = 10$ | $W_{tar} = 36$ |
|---|---|---|---|
| Reached target successfully | 3.6% | 1% | 98.8% |
| Driven successfully, but not reached the target within maximum steps | 93.4% | 96.8% | 0.4% |
| Terminated by collision or driving outside road | 3% | 2.2% | 0.8% |
| Average speed | 2.39 m/s | 1.56 m/s | 18.24 m/s |
| Average distance travelled | 861.64 m | 580.65 m | 2187.62 m |
| Average executed steps | 477.02 | 486.11 | 126.46 |

As mentioned in section II, in an ideal scenario the cost would amount to 2.31 monetary units, while the revenue $R_{tar}$ would be 2.78 units. Consequently, in this ideal case, the episodic reward would equal 2.78−2.31=0.47 when $W_{tar}$ is 1. This value is relatively small, making it challenging for the agent to learn how to reach the target. Moreover, Table 4 demonstrates that the RL agent 130 exhibits slow driving behavior and struggles to reach the target. However, it becomes evident that increasing the weight assists the agent in learning to drive at higher speeds and successfully reach the target.

In addition, the inventors have observed that the convergence of learning with realistic reward values takes about twice as many training steps compared to the basic reward function. Moreover, the new architecture trained with the basic reward function and the TCOP-based reward function has similar TCOP costs when evaluated with the same equation. This implies that incorporating realistic rewards and penalties in the training process could introduce additional complexities, making it more challenging for the agent to converge to an optimal and cost-effective driving strategy. This opens new possibilities to explore and address the challenges associated with training RL agents in real-world environments.

IV. Implementations

Attention will now be directed to implementations of this framework in a utility context. With reference to the flowchart in FIG. 2, a method 200 of controlling an ego vehicle 100 in a multi-lane driving environment 100 (see FIG. 3) according to various embodiments will now be described.

In a first step 210 of the method 200, a feedback controller 120 is provided which senses an actual motion state x of the vehicle 100 and determines a machine-level instruction u to the motion actuator for approaching a setpoint motion state x*. Each motion actuator is a technical component for applying a linear or angular acceleration on the vehicle, such as a drive motor, a brake, a steering arrangement, a drivetrain component, etc. The motion state represents a physical or technical variable describing the position, pose or movements of the ego vehicle 100, e.g., a lane number, a speed and a time-to-collision (TTC), though it may as well include variables describing at least one surrounding vehicles 192. The machine-level instruction finally may be an input variable to a motion actuator, such as an acceleration torque, a braking torque, a left/right differential torque, a gear and a steering angle.

The setpoint motion state x* may be a continuous variable (including a quasi-continuous digital representation of a real-valued variable, which has finite resolution) or a discrete variable. Step 210 may be completed by providing the feedback controller 120 with access to sensor data allowing the sensing of an actual motion state x of the vehicle. The feedback controller 120 may be configured to perform P, PI, PD or PID control or control governed by another suitable type of adaptive or non-adaptive feedback control law, to determine machine-level instructions u suitable for influencing the motion state x of the vehicle so as to agree or approximately agree with the setpoint motion state x*. The feedback controller 120 may be configured on the basis of a physical model of the vehicle 100, particularly, a physical model of the motion actuator's influence on relevant motion states of the vehicle.

Step 210 may include provisioning the feedback controller 120 by sourcing it from a supplier, or alternatively by configuring a multi-purpose controller, or further by implementing the feedback controller 120 using hardware and/or software. In an example where the feedback controller 120 is implemented as a computer program, step 210 may entail initiating an execution of this program on a processor communicatively coupled to the motion actuator and sensors in the vehicle 100.

The method 200 can be executed with just this feedback controller 120, or a second feedback controller 122 and any further feedback controller(s) may be added. This corresponds to an optional second step 212 of the method.

In embodiments of the method 200 where two or more feedback controllers 210, 212 are provided, they may be associated with functionally distinct groups of motion actuators in the vehicle 100. For example, a first feedback controller 120 may be configured to determine machine-level instructions $u_1$ to motion actuators generally responsible for longitudinally influencing the movements of the vehicle 100 (e.g., for commanding acceleration or braking), whereas a second feedback controller 122 may be configured to determine machine-level instructions $u_2$ to motion actuators generally responsible for laterally influencing the movements of the vehicle 100 (e.g., for commanding steering). Similarly, the feedback controllers 120, 122 may determine these instructions $u_1,u_2$ based on partially different motion states $x_1,x_2$ of the vehicle. In such embodiments, the notation in FIG. 1B may be understood as $u=(u_1,u_2)$, $x=(x_1,x_2)$, $x^*=(x^*_1,x^*_2)$.

In some of these embodiments, the first and second feedback controllers 210 have exclusive authority to directly control the respective groups of motion actuators. Provision is made for indirect control, e.g., that the speed may have to be adjusted—notably in view of the available road friction—during curvilinear movement due to action by the lateral actuators. For example, it may be desirable for the vehicle to decelerate slightly when it enters a curve and for it to accelerate gradually when it exits the curve and approaches straight road.

In one example of such embodiments, the (first) feedback controller 120 includes an automatic cruise controller (ACC), and the second feedback controller 122 includes a lane-change assistant. The ACC senses the leading vehicle distance $d_{lead}$ (see FIG. 3), is configured to maintain a setpoint time-to-collision (TTC), and provides instructions to a drive motor and brakes. It is recalled that the TTC can be computed as $d_{lead}/v_{x0}$. The lane-change assistant for its part senses the positions of the ego vehicle 100 and the surrounding vehicles 192, is configured to go to or stay in a setpoint lane, and—to do so—provides instructions to a steering arrangement in the vehicle. Optionally, the lane-change assistant may further activate and deactivate turning indicators as needed, and it may cause the ACC to adjust the velocity in connection to a lane-change maneuver.

Returning to FIG. 2 and the description of the method 200, a third step 214 includes providing a reinforcement-learning (RL) agent 130. The RL agent 130 is suitable for decision-making regarding the setpoint motion state x*. Reference is made to above section II for a discussion on a suitable learning algorithm, reward function and training data for providing the RL agent.

For example, the RL agent 130 may have been trained to perform such decision-making based on simulated or real-world training data. Suitable training data may be provided in accordance with the simulation setup described in section II and using random initial position and speed pattern of the surrounding vehicles 192. Generally speaking, any one or more learning algorithms that support a discrete action space can be used, including: deep Q network (DQN), advantage actor critic (A2C), proximal policy optimization (PPO). The definition of the reward function used during the training phase may be adapted to the system owner's needs and wishes. A basic example reward function is given in section II, as well as one TCOP-based reward function. The TCOP-based reward function may for example, in the case of a commercial vehicle, include a component representing driver salary, a revenue for reaching a target on time and a penalty for being delayed.

Executing the third step 214 may amount to initializing a preexisting RL agent 130 which is ready for use, and making sure its decisions are output in a form suitable for use by the feedback control as a setpoint motion state $x^*$. The third step 214 does not necessarily include defining and/or training the RL agent 130.

The input to the RL agent 130 forms the basis of the decision-making concerning the setpoint motion state $x^*$. In some embodiments, the RL agent 130 is fed with the same motion state of the vehicle 100 (and, optionally, of surrounding vehicles 192) as the feedback controller 120 uses, that is $s=x$. In an important class of embodiments, however, the state s used by the RL agent 130 is richer than the motion state x, in the sense that it provides a more complete description of the ego vehicle 100 and/or of the surrounding vehicles 192. This is illustrated by the vehicle model that was used in the simulation according to section II. Further, the state s may also include a state variable relating to the action requested by the RL agent 130, such as a lane-change state (sign of lateral velocity component) of the ego vehicle 100 in the case of a lane-change assistant. In some embodiments, the dimensionality of the state s may be greater than the dimensionality of the motion state x.

In the above-mentioned embodiments, where two feedback controllers 120, 122 are provided, the RL agent 130 is preferably trained to perform joint decision-making regarding the setpoint motion states $x^*_1, x^*_2$ for all of these. The decision-making is joint, for instance, if the setpoint motion states $x^*_1, x^*_2$ are output in response to a single query to the RL agent 130, particularly, in response to a single query to a single neural network in the RL agent 130. Further examples of joint decision-making include where the first setpoint motion state $x^*_1$ is decided in dependence of an earlier decision on the second setpoint motion states $x^*_2$, or vice versa.

In setups with three or more feedback controllers, the RL agent 130 may either perform joint decision-making for all, or there may be multiple parallel RL agents which are associated with respective subgroups of feedback controllers.

In two subsequent steps 216 and 218, the decisions made by the RL agent 130 are applied as the setpoint motion state $x^*$ of the feedback controller 120, whose machine-level instruction u is applied to the motion actuator in the vehicle 100. The total processing chain may be visualized as two mappings:

$$s \xrightarrow{\text{RL agent } 130} x^*$$

$$x, x^* \xrightarrow{\text{feedback controller } 120} u$$

where the RL agent 130 has an implicit dependence on neural network weights (and e.g. biases) $\theta$. Similarly, the feedback controller 120 is defined on the basis of a particular control law and assigned parameter values therein (e.g., feedback gain), and it depends parametrically on the setpoint value $x^*$ which is to be achieved.

Figure 4:
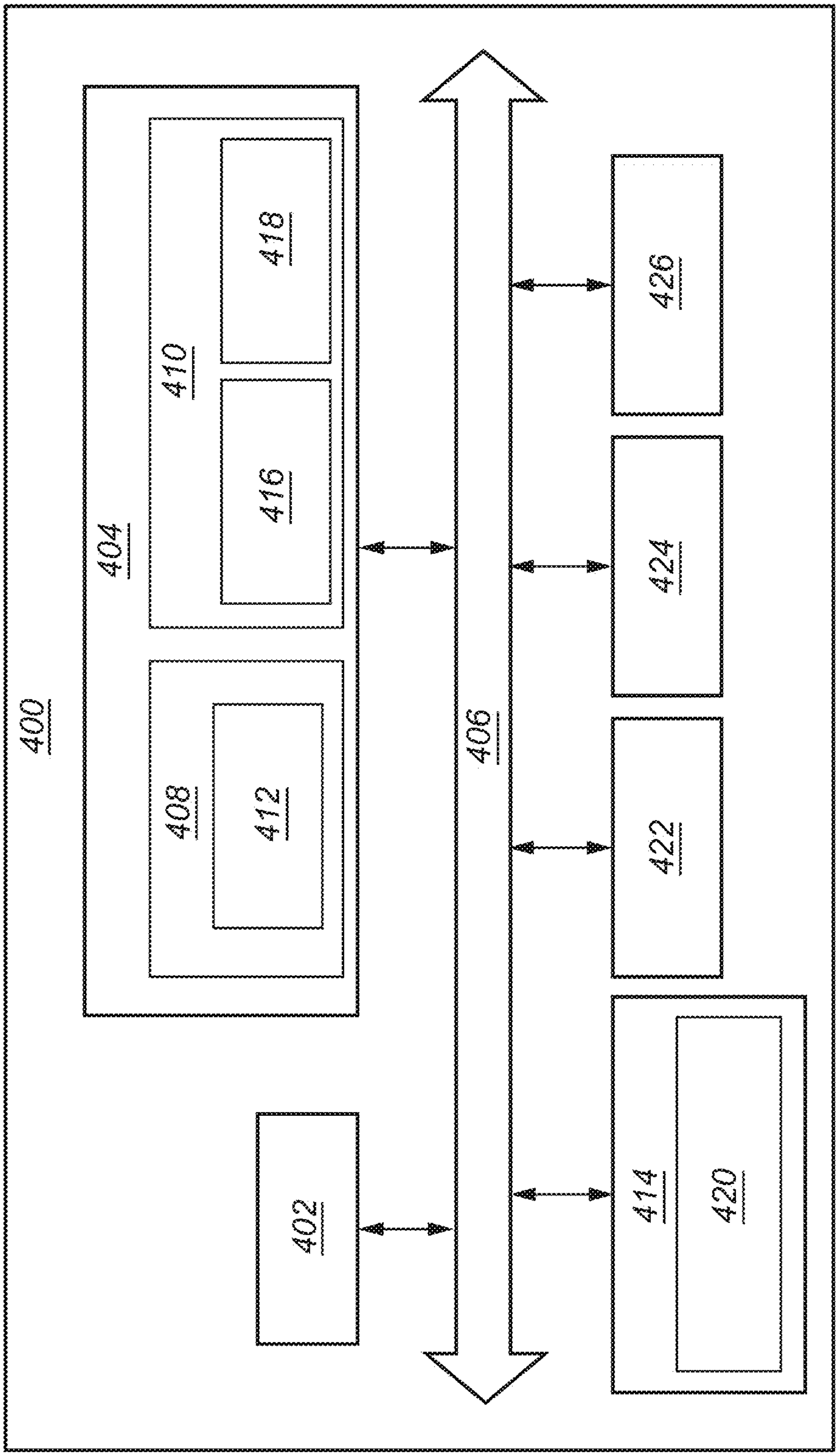
FIG. 4 is a block diagram of a computer system.

The method according to FIG. 4 can be implemented by of a vehicle-carried or stationary computer system. The computer system may be communicatively connected to sensorics, actuators and communication means, as necessary in view of the steps of the relevant embodiment of the method. In particular, the method may be executed in real time during operation of the ego vehicle, i.e., while the ego vehicle 110 moves in the multi-lane driving environment 100. Further, it is possible to execute the method by an entity not authorized to directly control movements of the surrounding vehicles 120, or by an entity that should not or should preferably not make use of its authority to directly control movements of the surrounding vehicles 120.

Figure 2:
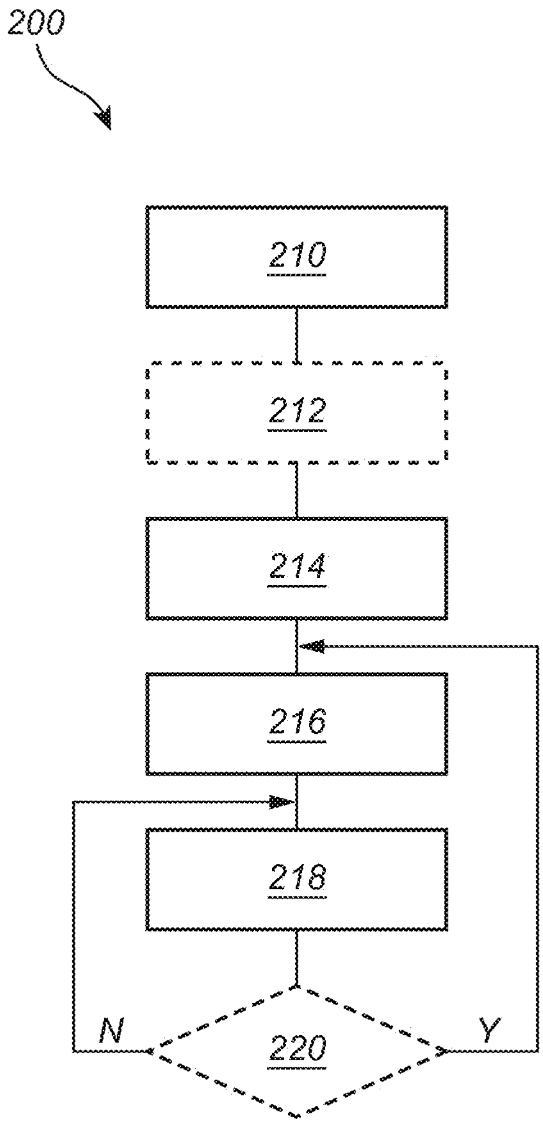
FIG. 2 is a flow chart of a method controlling at least one motion actuator in an autonomous vehicle, according to embodiments herein.

By way of example, FIG. 4 is a schematic diagram of a computer system 400 suitable for carrying out the method 200 according to FIG. 2. For example, the feedback controller 120 can be implemented as software code executing on general-purpose processing circuitry 402 of the computer system 400. The RL agent 130 can be implemented in a similar fashion or using a dedicated chipset, such as a hardware accelerator aimed at AI applications, or a suitably configured graphics processing unit (GPU). The feeding of information therebetween, including the setpoint motion state $x^*$, can be effectuated by a system bus 406.

The computer system 400 is adapted to execute instructions from a computer-readable medium to perform these and/or any of the functions or processing described herein. The computer system 400 may be connected (e.g., networked) to other machines in a LAN, an intranet, an extranet, or the Internet. While only a single device is illustrated, the computer system 400 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 400 may comprise at least one computing device or electronic device capable of including firmware, hardware, and/or executing software instructions to implement the functionality described herein. The computer system 400 may include processing circuitry 402 (e.g., processing circuitry including one or more processor devices or control units), a memory 404, and a system bus 406. The computer system 400 may include at least one computing device having the processing circuitry 402. The system bus 406 provides an interface for system components including, but not limited to, the memory 404 and the processing circuitry 402. The processing circuitry 402 may include any number of hardware components for conducting data or signal processing or for executing computer code stored in memory 404. The processing circuitry 402 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 402 may further include computer executable code that controls operation of the programmable device.

The system bus 406 may be any of several types of bus structures that may further interconnect to a memory bus (with or without a memory controller), a peripheral bus, and/or a local bus using any of a variety of bus architectures. The memory 404 may be one or more devices for storing data and/or computer code for completing or facilitating methods described herein. The memory 404 may include database components, object code components, script components, or other types of information structure for supporting the various activities herein. Any distributed or local memory device may be utilized with the systems and methods of this description. The memory 404 may be communicably connected to the processing circuitry 402 (e.g., via a circuit or any other wired, wireless, or network connection) and may include computer code for executing one or more processes described herein. The memory 404 may include non-volatile memory 408 (e.g., read-only memory (ROM), erasable programmable read-only memory (EPROM), electrically erasable programmable read-only memory (EEPROM), etc.), and volatile memory 410 (e.g., random-access memory (RAM)), or any other medium which can be used to carry or store desired program code in the form of machine-executable instructions or data structures and which can be accessed by a computer or other machine with processing circuitry 402. A basic input/output system (BIOS) 412 may be stored in the non-volatile memory 408 and can include the basic routines that help to transfer information between elements within the computer system 400.

The computer system 400 may further include or be coupled to a non-transitory computer-readable storage medium such as the storage device 414, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 414 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 414 and/or in the volatile memory 410, which may include an operating system 416 and/or one or more program modules 418. All or a portion of the examples disclosed herein may be implemented as a computer program 420 stored on a transitory or non-transitory computer-usable or computer-readable storage medium (e.g., single medium or multiple media), such as the storage device 414, which includes complex programming instructions (e.g., complex computer-readable program code) to cause the processing circuitry 402 to carry out actions described herein. Thus, the computer-readable program code of the computer program 420 can comprise software instructions for implementing the functionality of the examples described herein when executed by the processing circuitry 402. In some examples, the storage device 414 may be a computer program product (e.g., readable storage medium) storing the computer program 420 thereon, where at least a portion of a computer program 420 may be loadable (e.g., into a processor) for implementing the functionality of the examples described herein when executed by the processing circuitry 402. The processing circuitry 402 may serve as a controller or control system for the computer system 400 that is to implement the functionality described herein.

The computer system 400 may include an input device interface 422 configured to receive input and selections to be communicated to the computer system 400 when executing instructions, such as from a keyboard, mouse, touch-sensitive surface, etc. Such input devices may be connected to the processing circuitry 402 through the input device interface 422 coupled to the system bus 406 but can be connected through other interfaces, such as a parallel port, an Institute of Electrical and Electronic Engineers (IEEE) 1394 serial port, a Universal Serial Bus (USB) port, an IR interface, and the like. The computer system 400 may include an output device interface 424 configured to forward output, such as to a display, a video display unit (e.g., a liquid crystal display (LCD) or a cathode ray tube (CRT)). The computer system 400 may include a communications interface 426 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

To summarize, the present disclosure is concerned with optimal trajectory planning for an autonomous vehicle (AV) operating in dense traffic, where vehicles closely interact with each other. To tackle this problem, the inventors propose a novel framework that couples trajectory prediction and planning in multi-agent environments, using distributed model predictive control. A demonstration of this framework is presented in simulation, employing a trajectory planner using non-linear model predictive control. Performance and convergence are analyzed under different assumptions about the prediction errors. The results indicate, in broadly defined conditions, that the obtained locally optimal solutions are superior to the results of decoupled prediction and planning.

V. Closing Remarks

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

By way of summary, the comparative study presented in section III demonstrates how prudent selection of the state space and action space may improve the learning process of an RL agent for enabling the tactical decision-making in autonomous trucks. The results demonstrate in particular that learning can be accelerated—and overall performance improved—by training the agent to focus on high-level decisions, such as the magnitude of time gap (TTC) to the leading vehicle to be maintained, while leaving the low-level speed control to a physics-based controller. The results thus demonstrate the benefits of separating the decision-making into one high-level process and one low-level process. In particular examples, further, the low-level decision-making process has been separated into multiple parallel subprocesses (corresponding to groups of motion actuations in the vehicle) while the high-level process remains monolithic with joint decision-making for all the low-level subprocesses.

REFERENCES

Das, Lokesh Chandra, and Myounggyu Won. 2021. "Saint-Acc: Safety-Aware Intelligent Adaptive Cruise Control for Autonomous Vehicles Using Deep Reinforcement Learning." In *ICML.*

De Jong, Gerard, Hugh Gunn, and Warren Walker. 2004. "National and International Freight Transport Models: An Overview and Ideas for Future Development." *Transport Reviews* 24.

Desjardins, Charles, and Brahim Chaib-draa. 2011. "Cooperative Adaptive Cruise Control: A Reinforcement Learning Approach." *IEEE Transactions on Intelligent Transportation Systems* 12.

Erdmann, Jakob (2014), "Lane-Changing Model in SUMO". In: *Proceedings of the SUMO*2014 *Modeling Mobility with Open Data,* 24, pp. 77-88. Deutsches Zentrum für Luft-und Raumfahrt e.V. SUMO2014, Berlin, Deutschland. ISSN 1866-721X.

Grislis, Aivis. 2010. "Longer Combination Vehicles and Road Safety." *Transport* 25.

Hoel, Carl-Johan E. 2020. "Source Code for 'Tactical Decision-Making in Autonomous Driving by Reinforcement Learning with Uncertainty Estimation'." https://github.com/carljohanhoel/BayesianRLForAutonomousDriving.

Hoel, Carl-Johan, Krister Wolff, and Leo Laine. 2020. "Tactical Decision-Making in Autonomous Driving by Reinforcement Learning with Uncertainty Estimation." In *Intelligent Vehicles Symposium*. IEEE.

Jiménez, Felipe, José Eugenio Naranjo, José Javier Anaya, Fernando García, Aurelio Ponz, and José María Armingol. 2016. "Advanced Driver Assistance System for Road Environments to Improve Safety and Efficiency." *Transportation Research Procedia* 14.

Kiran, B Ravi, Ibrahim Sobh, Victor Talpaert, Patrick Mannion, Ahmad A Al Sallab, Senthil Yogamani, and Patrick Pérez. 2021. "Deep Reinforcement Learning for Autonomous Driving: A Survey." *Transactions on Intelligent Transportation Systems* 23.

Krauss, S., P. Wagner, and C. Gawron. 1997. "Metastable States in a Microscopic Model of Traffic Flow." *Phys. Rev. E* 55.

Lin, Yuan, John McPhee, and Nasser L. Azad. 2021. "Comparison of Deep Reinforcement Learning and Model Predictive Control for Adaptive Cruise Control." *IEEE Transactions on Intelligent Vehicles* 6.

Lopez, Pablo Alvarez, Michael Behrisch, Laura Bieker-Walz, Jakob Erdmann, Yun-Pang Flötteröd, Robert Hilbrich, Leonhard Lücken, Johannes Rummel, Peter Wagner, and Evamarie Wießner. 2018. "Microscopic Traffic Simulation Using SUMO." In *International Conference on Intelligent Transportation Systems*. IEEE.

Moreno, Gonzalo, Lauro Cesar Nicolazzi, Rodrigo De Souza Vieira, and Daniel Martins. 2018. "Stability of Long Combination Vehicles." *International Journal of Heavy Vehicle Systems* 25.

Nilsson, Peter, Leo Laine, Jesper Sandin, Bengt Jacobson, and Olle Eriksson. 2018. "On Actions of Long Combination Vehicle Drivers Prior to Lane Changes in Dense Highway Traffic—a Driving Simulator Study." *Transportation Research Part F: Traffic Psychology and Behaviour* 55.

Pathare, Deepthi. 2023. "Source Code for 'Improved Tactical Decision Making and Control Architecture for Autonomous Truck in SUMO Using Reinforcement Learning'." https://github.com/deepthi-pathare/Autonomous-truck-sumo-gym-env/(available from 21 Sep. 2023)

Raffin, Antonin, Ashley Hill, Adam Gleave, Anssi Kanervisto, Maximilian Ernestus, and Noah Dormann. 2021. "Stable-Baselines3: Reliable Reinforcement Learning Implementations." *Journal of Machine Learning Research* 22.

Sallab, Ahmad El, Mohammed Abdou, Etienne Perot, and Senthil Yogamani. 2017. "Deep Reinforcement Learning Framework for Autonomous Driving." *arXiv Preprint arXiv:* 1704.02532.

Schulman, John, Filip Wolski, Prafulla Dhariwal, Alec Radford, and Oleg Klimov. 2017. "Proximal Policy Optimization Algorithms." https://arxiv.org/abs/1707.06347.

Shalev-Shwartz, Shai, Shaked Shammah, and Amnon Shashua. 2016. "Safe, Multi-Agent, Reinforcement Learning for Autonomous Driving." *arXiv Preprint arXiv:* 1610.03295.

Shaout, Adnan, Dominic Colella, and Selim Awad. 2011. "Advanced Driver Assistance Systems-Past, Present and Future." In *International Computer Engineering Conference*. IEEE.

Sutton, Richard S., and Andrew G. Barto. 2018. *Reinforcement Learning: An Introduction*. Second. The MIT Press. http://incompleteideas.net/book/the-book-2nd.html.

Svensson, Hampus Gummesson, Christian Tyrchan, Ola Engkvist, and Morteza Haghir Chehreghani. 2023. "Utilizing Reinforcement Learning for de Novo Drug Design." https://arxiv.org/abs/2303.17615.

Treiber, Martin, Ansgar Hennecke, and Dirk Helbing. "Congested traffic states in empirical observations and microscopic simulations." Physical review E 62.2 (2000): 1805.

Xiao, Lingyun, and Feng Gao. 2010. "A Comprehensive Review of the Development of Adaptive Cruise Control Systems." *Vehicle System Dynamics*.

Yang, Da, Xiaoping Qiu, Dan Yu, Ruoxiao Sun, and Yun Pu. 2015. "A Cellular Automata Model for Car-Truck Heterogeneous Traffic Flow Considering the Car-Truck Following Combination Effect." *Physica A: Statistical Mechanics and Its Applications* 424.

Yang, Junru, Xingliang Liu, Shidong Liu, Duanfeng Chu, Liping Lu, and Chaozhong Wu. 2020. "Longitudinal Tracking Control of Vehicle Platooning Using DDPG-Based PID." In 2020 4*th CAA International Conference on Vehicular Control and Intelligence* (*CVCI*).

Zhao, Dongbin, Bin Wang, and Derong Liu. 2013. "A Supervised Actor-Critic Approach for Adaptive Cruise Control." *Soft Computing* 17.

The invention claimed is:

1. A computer-implemented method of controlling at least one motion actuator in an autonomous or semi-autonomous vehicle, comprising:

sensing, by a feedback controller including an adaptive cruise controller (ACC), an actual motion state of the vehicle, the feedback controller configured to control at least one longitudinal motion actuator;

providing a second feedback controller including a lane-change assistant, the second feedback controller configured to control at least one lateral motion actuator;

selecting, by a reinforcement-learning (RL) agent, a setpoint motion state based on the actual motion state of the vehicle, the RL agent trained to perform joint decision-making regarding a setpoint time-to-collision (TTC) of the at least one longitudinal motion actuator and a setpoint lane of the at least one lateral motion actuator;

determining, by the feedback controller, a machine-level instruction to the at least one motion actuator for approaching or maintaining the setpoint motion state; and applying the machine-level instruction to the at least one motion actuator.

2. The method of claim 1, wherein the feedback setpoint motion state is represented as a continuous variable.

3. The method of claim 1, wherein the RL agent is trained to perform tactical decision-making regarding the setpoint motion state.

4. The method of claim 1, wherein the RL agent is trained to perform decision-making based on a state of the vehicle and/or of vehicles surrounding the vehicle which is not included in the actual motion of the vehicle state sensed by the feedback controller.

5. The method of claim 1, wherein the RL agent is configured with one of the following learning algorithms:

deep Q network (DQN);

advantage actor critic (A2C);

proximal policy optimization (PPO).

6. The method of claim 1, wherein the RL agent has been trained to perform decision-making in such manner as to minimize a total cost of operation (TCOP).

7. A computer program product comprising program code, stored on a non-transitory computer-readable medium, for performing, when executed by processing circuitry of a computer system, the method of claim 1.

8. A non-transitory computer-readable storage medium comprising instructions, which when executed by processing circuitry of a computer system, cause the processing circuitry to perform the method of claim 1.

9. A computer system for controlling at least one motion actuator in an autonomous or semi-autonomous vehicle, the computer system comprising processing circuitry implementing:

a feedback controller including an adaptive cruise controller (ACC), the feedback controller configured to sense an actual motion state of the vehicle, control at least one longitudinal motion actuator, and determine a machine-level instruction to the at least one motion actuator for approaching or maintaining a setpoint motion state;

a second feedback controller including a lane-change assistant, the second feedback controller configured to control at least one lateral motion actuator; and a reinforcement-learning (RL) agent trained to select the setpoint motion state based on the actual motion state of the vehicle, the RL agent trained to perform joint decision-making regarding a setpoint time-to-collision (TTC) of the at least one longitudinal motion actuator and a setpoint lane of the at least one lateral motion actuator;

wherein the processing circuitry is configured to apply the machine-level instruction to the at least one motion actuator.

10. A vehicle comprising the computer system of claim 9.

11. The computer system of claim 9, wherein the feedback controller is configured for a setpoint motion state represented as a continuous variable.

12. The computer system of claim 9, wherein the RL agent is trained to perform tactical decision-making regarding the setpoint motion state.

* * * * *